US006073107A

United States Patent [19]
Minkiewicz et al.

[11] Patent Number: 6,073,107
[45] Date of Patent: Jun. 6, 2000

[54] PARAMETRIC SOFTWARE FORECASTING SYSTEM AND METHOD

[76] Inventors: Arlene F. Minkiewicz, 19 Browning Rd., Merchantville, N.J. 08109; Bruce E. Fad, 1809 Cardinal Lake Dr., Cherry Hill, N.J. 08003

[21] Appl. No.: 08/918,343

[22] Filed: Aug. 26, 1997

[51] Int. Cl.[7] .................................................. G06F 17/60
[52] U.S. Cl. ............................ 705/7; 705/7; 705/400; 705/1; 705/28; 705/500
[58] Field of Search ..................................... 705/7, 400, 1, 705/28, 500

[56] References Cited

U.S. PATENT DOCUMENTS

| | | | |
|---|---|---|---|
| 5,548,718 | 8/1996 | Siegel et al. | 714/38 |
| 5,655,074 | 8/1997 | Rauscher | 714/38 |
| 5,793,632 | 8/1998 | Fad et al. | 705/400 |
| 5,878,262 | 3/1999 | Shoumura et al. | 395/710 |
| 5,937,389 | 8/1999 | Maxwell | 705/10 |
| 5,940,806 | 8/1999 | Danial | 705/26 |
| 5,946,662 | 8/1999 | Ettl et al. | 705/8 |
| 5,953,707 | 9/1999 | Huang et al. | 705/10 |
| 5,963,910 | 10/1999 | Ulwick | 705/7 |
| 5,983,194 | 11/1999 | Richardson et al. | 705/7 |

OTHER PUBLICATIONS

Barry W. Boehm, Software Engineering Economics, Prenitce–Hall, Inc., pp. 65–69,, 42–43, 316–323 1981.
Price H 3.1 Reference Manual, Lockheed Martin, Copyright 1996 Lockheed Martin Corporation, 16 Chapters.
Price HL Reference Manual, First Edition, Lockheed Martin, Copyright 1996 Lockheed Martin Corporation, 11 Chapters.
Price M Reference Manual, First Edition, Martin Marietta, Copyright 1994 Lockheed Martin Marietta 14 Chapters.
Price S Reference Manual, Third Edition, Copyright 1993, Lockheed Martin Corporation 18 Chapters.

*Primary Examiner*—Allen R. MacDonald
*Assistant Examiner*—Akiba Robinson-Boyce
*Attorney, Agent, or Firm*—Rockey, Milnamow & Katz, Ltd.

[57] ABSTRACT

A parametric software estimating system provides a class of user selectable size metrics. At least one of the metrics is adapted specifically for use with proposed object oriented software systems. An estimate of labor hours for various development categories can be provided along with estimated costs. The effects of imposing selected constraints on the development process can be dynamically studied enabling a user to evaluate alternatives.

19 Claims, 12 Drawing Sheets

FIG. 8

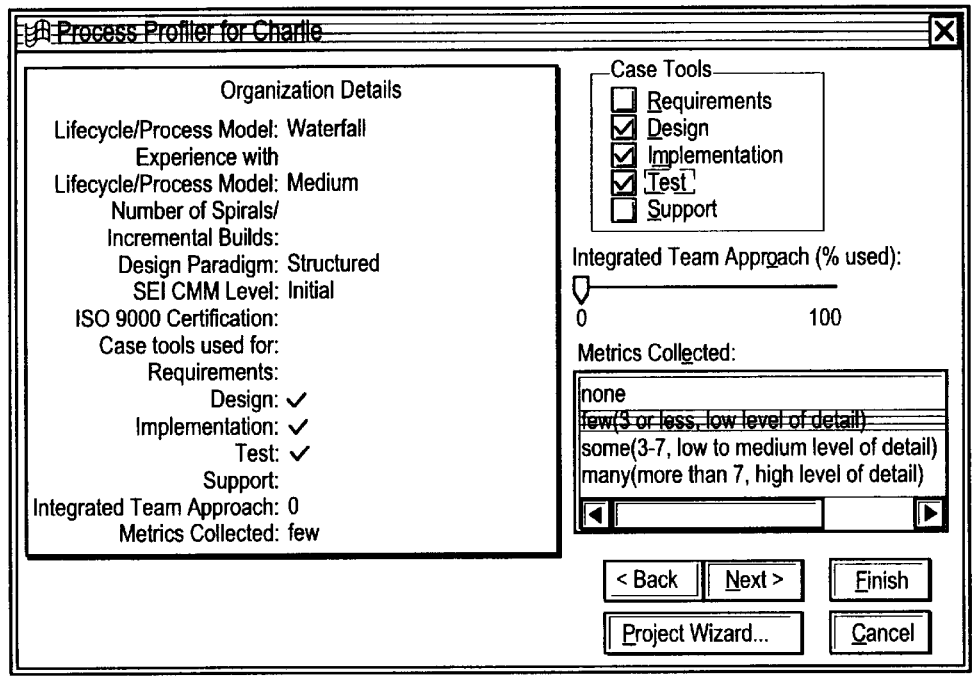

FIG. 9

| Function Po... | Function Po... | Defects/Fun... | Purchase C... | Operational... | System Size | |
|---|---|---|---|---|---|---|
| 0.00 | 0.00 | 0.00 | 0.00 | 0.00 | 0.00 | |
| Activity | System Designe... | Programmers | Test Engineers/... | Total | Activity Length | Dates |
| Requirements Ana... | 319.84 | 0.00 | 150.51 | 470.35 | 60.18 | 7/1/97 |
| Preliminary Design | 192.00 | 59.52 | 74.88 | 326.40 | 73.01 | 7/31/97 |
| Detail Design | 288.00 | 89.28 | 112.32 | 489.61 | 102.95 | 9/29/97 |
| Code and Unit Test | 23.97 | 141.01 | 35.25 | 200.24 | 66.64 | 12/27/97 |
| Integration and Test | 146.34 | 97.56 | 243.91 | 487.81 | 83.15 | 2/24/98 |
| Development Total | 970.16 | 387.38 | 616.87 | 1,974.41 | 385.94 | 2/24/98 |
| Correction | 0.00 | 0.00 | 0.00 | 0.00 | 0.00 | 0.00 |
| Adaptation | 0.00 | 0.00 | 0.00 | 0.00 | 0.00 | 0.00 |
| Enhancement | 0.00 | 0.00 | 0.00 | 0.00 | 0.00 | 0.00 |
| Support Total | 0.00 | 0.00 | 0.00 | 0.00 | 0.00 | 0.00 |
| Total | 970.16 | 387.38 | 616.87 | 1,974.41 | 385.94 | 2/24/98 |
| Activity | System Desi... | Programmers | Test Engine... | Total | Activity Len... | |
| System I&T C... | 187.25 | 66.87 | 191.71 | 445.83 | 156.41 | |

| Activity | System D... | Program... | Test Engi... | Project M... | Quality As.. | Technical.. | Total | Activity L.. | Dates |
|---|---|---|---|---|---|---|---|---|---|
| Function Po... 0.00 | Function Po... 0.00 | Defects/Fun... 0.00 | Purchase C... 0.00 | Operational... 0.00 | System Size 0.00 | | | | |
| Requiremen... | 0.00 | 0.00 | 0.00 | 0.00 | 0.00 | 0.00 | 0.00 | 0.00 | 7/1/97 |
| Preliminary ... | 181.10 | 56.14 | 70.63 | 24.38 | 29.65 | 14.26 | 376.17 | 48.94 | 7/1/97 |
| Detail Design | 271.65 | 84.21 | 105.94 | 36.57 | 44.48 | 21.39 | 564.25 | 102.95 | 7/31/97 |
| Code and U... | 22.61 | 133.01 | 33.25 | 10.34 | 36.71 | 5.34 | 241.26 | 66.64 | 10/28/97 |
| Integration... | 138.03 | 92.02 | 230.06 | 29.20 | 162.16 | 29.71 | 681.19 | 83.15 | 12/26/97 |
| System Inte... | 187.25 | 66.87 | 191.71 | 28.30 | 157.12 | 28.79 | 660.04 | 299.58 | 7/1/97 |
| Installation | 80.06 | 43.23 | 63.16 | 11.83 | 65.71 | 12.04 | 276.03 | 185.74 | 11/27/97 |
| Developme... | 880.71 | 475.48 | 694.75 | 140.63 | 495.84 | 111.54 | 2,798.95 | 787.00 | 12/26/97 |
| Correction | 0.00 | 0.00 | 0.00 | 0.00 | 0.00 | 0.00 | 0.00 | 0.00 | 0.00 |
| Adaptation | 0.00 | 0.00 | 0.00 | 0.00 | 0.00 | 0.00 | 0.00 | 0.00 | 0.00 |
| Enhancement | 0.00 | 0.00 | 0.00 | 0.00 | 0.00 | 0.00 | 0.00 | 0.00 | 0.00 |

FIG. 12

| Months | | | | | | | | |
|---|---|---|---|---|---|---|---|---|
| Function Po... | Function Po... | Defects/Fun... | Purchase C... | Operational... | System Size | | | |
| 0.00 | 0.00 | 0.00 | 0.00 | 0.00 | 0.00 | | | |
| Activity | System D... | Program... | Test Engi... | Project M... | Quality As.. | Technical. | Total | Activity L.. | Dates |
| Requiremen... | 2.06 | 0.00 | 0.97 | 0.24 | 0.35 | 0.14 | 3.77 | 60.18 | 7/1/97 |
| Preliminary ... | 1.24 | 0.38 | 0.48 | 0.17 | 0.20 | 0.10 | 2.57 | 73.01 | 7/31/97 |
| Detail Design | 1.86 | 0.58 | 0.72 | 0.25 | 0.30 | 0.15 | 3.86 | 102.95 | 9/29/97 |
| Code and U... | 0.15 | 0.91 | 0.23 | 0.07 | 0.25 | 0.04 | 1.65 | 66.64 | 12/27/97 |
| Integration a.. | 0.94 | 0.63 | 1.57 | 0.20 | 1.11 | 0.20 | 4.66 | 83.15 | 2/24/98 |
| System Inte... | 1.21 | 0.43 | 1.24 | 0.18 | 1.01 | 0.19 | 4.26 | 368.50 | 7/1/97 |
| Installation | 0.75 | 0.29 | 0.52 | 0.10 | 0.55 | 0.10 | 2.31 | 228.47 | 1/1/98 |
| Developme... | 8.21 | 3.22 | 5.74 | 1.21 | 3.78 | 0.91 | 23.09 | 982.90 | 2/24/98 |
| Correction | 0.00 | 0.00 | 0.00 | 0.00 | 0.00 | 0.00 | 0.00 | 0.00 | 0.00 |
| Adaptation | 0.00 | 0.00 | 0.00 | 0.00 | 0.00 | 0.00 | 0.00 | 0.00 | 0.00 |
| Enhancement | 0.00 | 0.00 | 0.00 | 0.00 | 0.00 | 0.00 | 0.00 | 0.00 | 0.00 |

FIG. 13

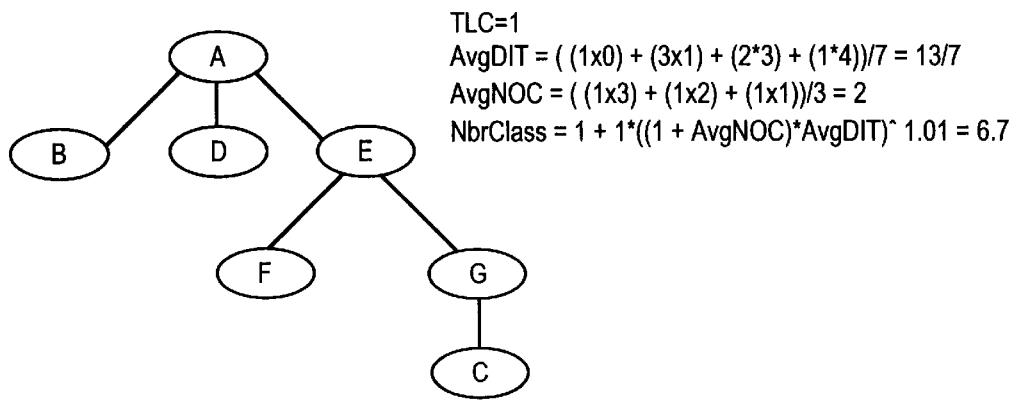

TLC=1
AvgDIT = ( (1x0) + (3x1) + (2*3) + (1*4))/7 = 13/7
AvgNOC = ( (1x3) + (1x2) + (1x1))/3 = 2
NbrClass = 1 + 1*((1 + AvgNOC)*AvgDIT)^1.01 = 6.7

PARAMETRIC SOFTWARE FORECASTING SYSTEM AND METHOD

FIELD OF THE INVENTION

The invention pertains to parametric forecasting systems. More particularly, the invention pertains to such systems that are adapted to estimating costs for object oriented software development projects.

BACKGROUND OF THE INVENTION

Parametric cost estimating and forecasting systems are known for use in estimating software development project costs. One such system is commercially available from the Price Systems Division of the Assignee hereof. This product is marketed under the trademark PRICE-S. Characteristics of this product are described in the PRICE-S Reference Manual Copyright 1993. This manual is hereby incorporated herein by reference. It is useful for indicating the background of the invention and for illustrating the state of the art.

The PRICE-S product carries out a top down analysis based on non-cost-type input parameters which include project type, hardware type, operating environment, specification level, language and support costs if applicable. This product does not incorporate size metrics that have been developed specifically for use with object oriented software.

While known systems are useful, they have in the past tended to be marketed to and used by financial analysts or financial departments of organizations, as opposed to technical or development departments. It would be desirable to have parametric-type software estimating products oriented to meet the needs of technical managers. Preferably such products would be suited for estimating new, unimplemented object oriented software systems. It would also be desirable to be able to graphically evaluate the effects of parameter variation on project cost.

SUMMARY OF THE INVENTION

Parametric software forecasting systems and methods which are especially adapted to estimate object oriented system development costs utilize a plurality of non-cost based input parameters. These include development complexity, organizational practices and productivity, specification level and size. Software size can be reflected by specification of object-related characteristics of the proposed system to form an object oriented size metric.

One useful metric is based on calculating predictive object points. Alternately, other size metrics such as number of lines of code or number of function points can be used alone or in combination with object oriented metrics.

In response to the specified characteristics an object oriented metric, indicative of the complexity of the proposed system, can be determined. The size metric, for example based on predictive object points, is in turn made available to an analysis engine for production of labor and cost estimates.

The estimates can be broken down by development or implementation activities. Outputs can include labor hours in days or months for selected modules, sub-systems or an entire project. Labor rate(s) can be combined with labor hours to produce estimated costs. For multiple jurisdiction projects, labor rates can be expressed in respective currencies.

Beyond determining estimated cost, an analysis can be carried out using information available from the estimating process to establish what effect(s) imposing various constraints will have on other outputs. Various parameters such as available personnel, schedules, or product characteristics, can be varied to determine how they affect other system forecasts. These variations can be presented graphically for review by a user. In response to further modifications by a user, the analysis process can be repeated. Revised graphical results can be presented to the user.

In one aspect, a predictive metric can incorporate several metrics suitable for use with object oriented software. These can include, the number of top level classes, the roots in a class diagram; the average number of weighted methods per class, an average of the number of methods per class; average depth of inheritance tree, an indication of how deep a class is in the inheritance tree; and an average number of children per class, indicative of direct descendants.

The present system and method are especially applicable to software to be developed in a commercial, competitive environment. The system and method are usable during all phases of development. Original forecasts can be provided based on only the over-all type of information available at that time. Subsequently, the method can be carried out numerous times based on more detailed project information and specifications. This will produce updated forecasts.

Numerous other advantages and features of the present invention will become readily apparent from the following detailed description of the invention and the embodiments thereof, from the claims and from the accompanying drawings.

BRIEF DESCRIPTION OF THE DRAWINGS

FIG. 8 is a screen usable for specifying information pertaining to project organization;

FIG. 9 illustrates graphically a forecast of effort, time, quality and productivity for an exemplary project;

FIG. 12 is an exemplary forecast of months to carry out various phases of an exemplary software development project.

FIG. 13 illustrates exemplary characteristics of object oriented software;

DETAILED DESCRIPTION OF THE PREFERRED EMBODIMENT

Figure 1:
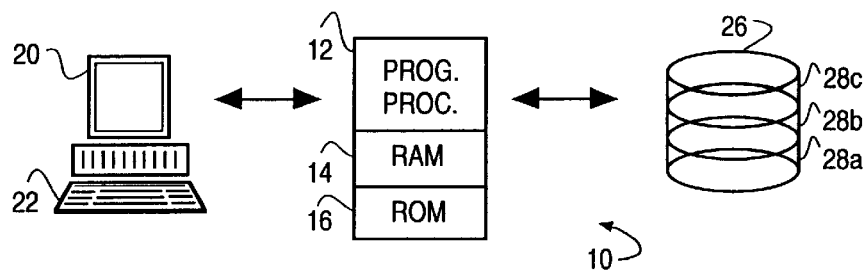
FIG. 1 is a block diagram of a system in accordance with the present invention.

While this invention is susceptible of embodiment in many different forms, there are shown in the drawing, and will be described herein in detail, specific embodiments thereof with the understanding that the present disclosure is to be considered as an exemplification of the principles of the invention and is not intended to limit the invention to the specific embodiments illustrated.

FIG. 1 illustrates schematically a system 10 in accordance with the present invention. The system 10 includes a programmable processor 12, which could be a digital programmable processor such as a computer of a conventional variety.

The processor 12 includes read-write memory 14 which could be implemented as solid state, random access memory for the purpose of temporary storage of programs or data. The processor 12 could also include read-only memory 16 for programs or constants which are not intended to be changed.

Coupled to the processor 12 is a visual output device 20 which might include some form of a conventional display such as a monitor or a plasma panel. The input/output device 20 also includes a keyboard 22 for purposes of entry of parameter values by a user. A mouse could be used as an alternate form of an input device.

Also coupled to programmable processor 12 are one or more mass read-write storage units 26 which might be implemented as magnetic disk drives. The storage units 26 are intended to provide long-term storage of programs and data which are loaded into the read-write memory 14 for purposes of execution or processing.

The units 26 can include drives with replaceable media such as magnetic disks, CD ROMS or DVDs. The details of program storage, and execution along with data storage and processing thereof, could readily be determined by one of skill in the art in view of the present description. The system 10 could be implemented as a commercially available personal computer.

Figure 2:
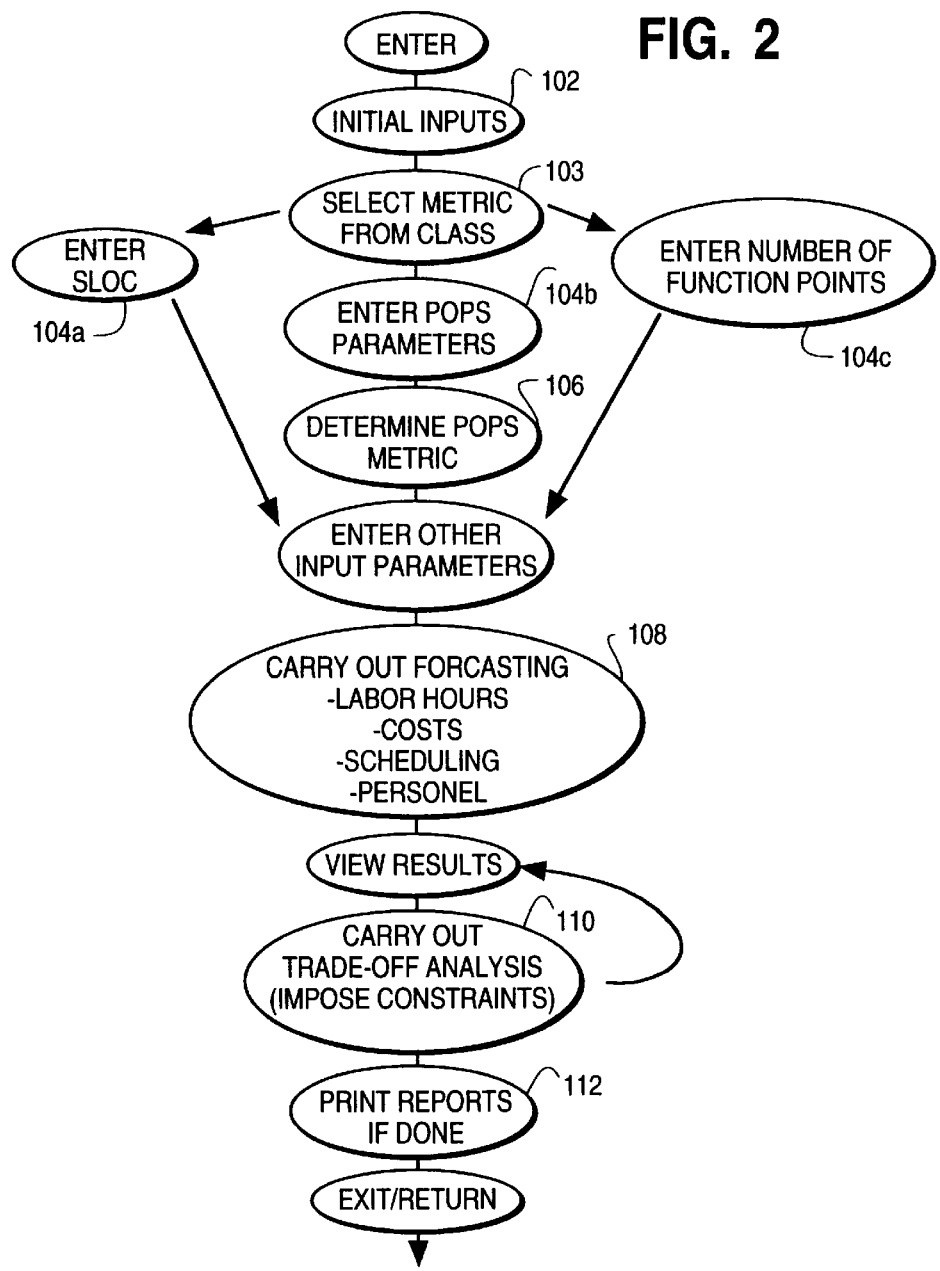
FIG. 2 is an over-all flow diagram illustrating the steps of the method which can be carried out using the system of FIG. 1.

Programs from the storage units 26 are made available to the programmable processor 12 for carrying out a process 100 illustrated in FIG. 2. In a step 102, a plurality of initial inputs can be specified for carrying out the forecasting process. These inputs, preferably, can be specified using a graphical user interface.

Some of the types of information include application-type, specification-level, hardware environment, percent of the system which is to be designed for reuse, cross platform portability. Other information such as life cycle information, support costs, CASE-type tools to be used and the like of a more detailed nature may be entered if available.

One of a plurality of metrics useful for specifying expected software system or software element size is selectable in a step 103. Selectable metrics include estimated source lines of code, number of function points or number of predictive object points. The use and determination of numbers of lines of code as well as numbers of function points would be known to those of skill in the art. No further discussion of those metrics is necessary. The characteristics and process of establishing the number of predictive object points specifically for use with object oriented software systems are discussed in more detail subsequently.

In a respective step 104a, 104b or 104c, the respective information is entered for the selected metric. Subsequently, as needed in a step 106, any processing with respect to the selected metric and the entered information associated therewith is carried out.

To the extent that other project or system information is available such as available numbers of personnel and skill levels can be entered along with any known risk analysis information. Those parameters can be entered initially in the step 102 or subsequent to the step 106.

In a step 108, forecasts are made of number of required labor hours. Associated labor costs, based on provided labor rate information can also be generated. Cost estimates can be broken down and associated with specificated subsystems, elements or modules. One or more schedules can be developed based on entered and default values.

Subsequent to the estimating process in the step 108, in step 110, an interactive analysis can be conducted of the effect on various developed estimates of imposing ore or more constraints on the development process. Possible constraints include limitation on personnel, budgetary limitations, or changes in completion dates;. The effects of the imposed constraints can be graphically viewed providing a source for immediate feedback and further understanding of the effects the various constraints can have on the process.

In the step 112, one or more reports can be generated setting forth the results of the forecasting step 108. The results of the trade-off analysis of the step 110 can also be output in printed form.

Figure 3:
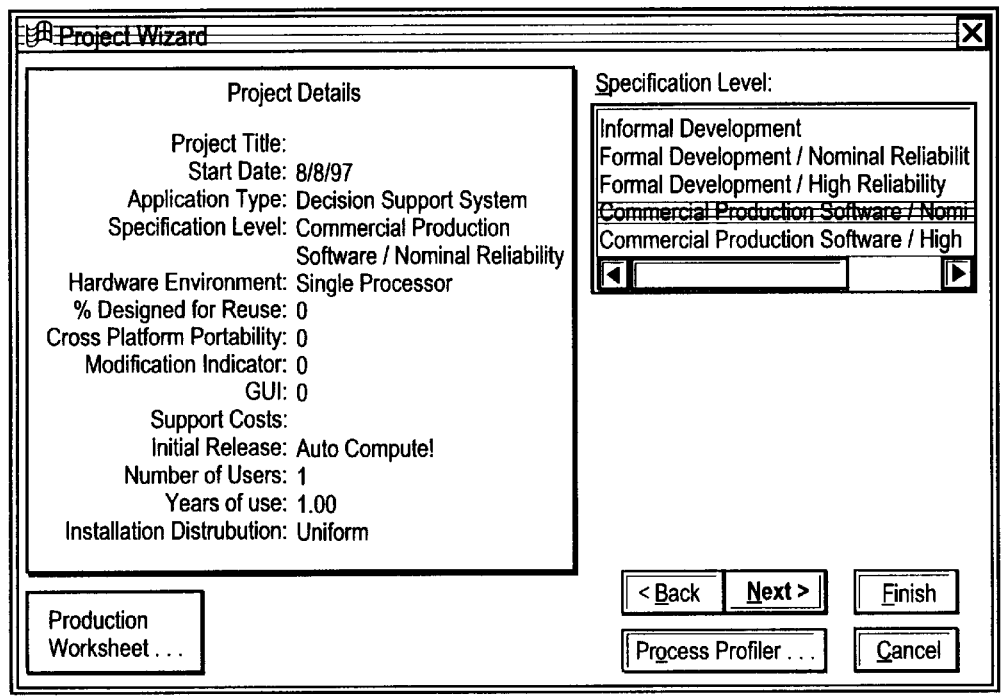
FIG. 3 is a graphical display illustrating various specifiable parameters for a software development project to be estimated using the system of FIG. 1.
Figure 4A:
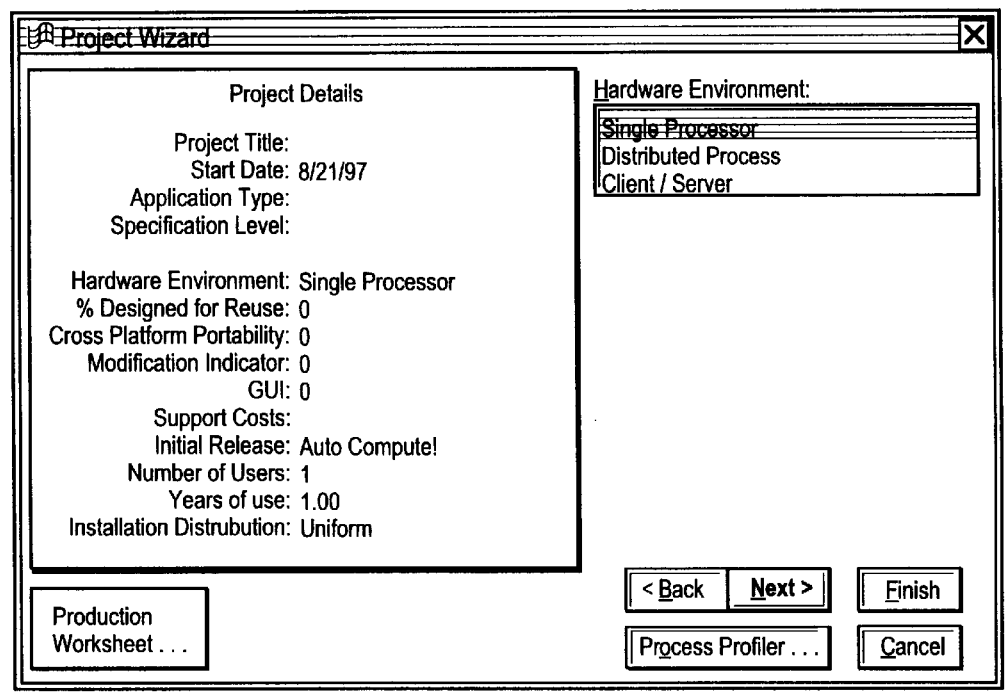
FIGS. 4 and 4a are screens illustrating other parameters which can be specified.
Figure 4B:
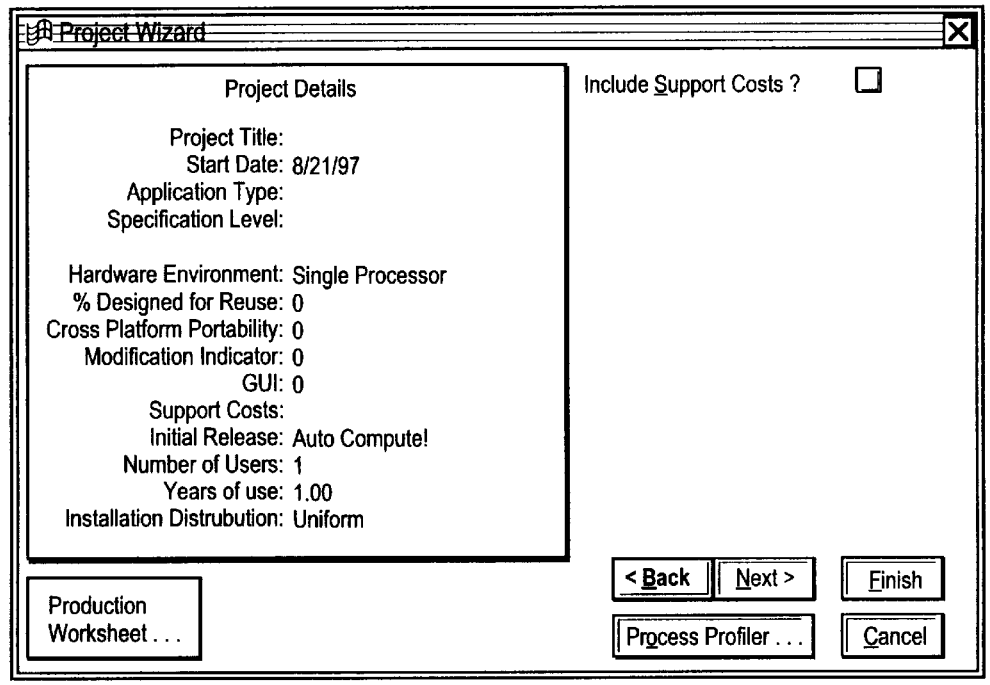
Figure 5:
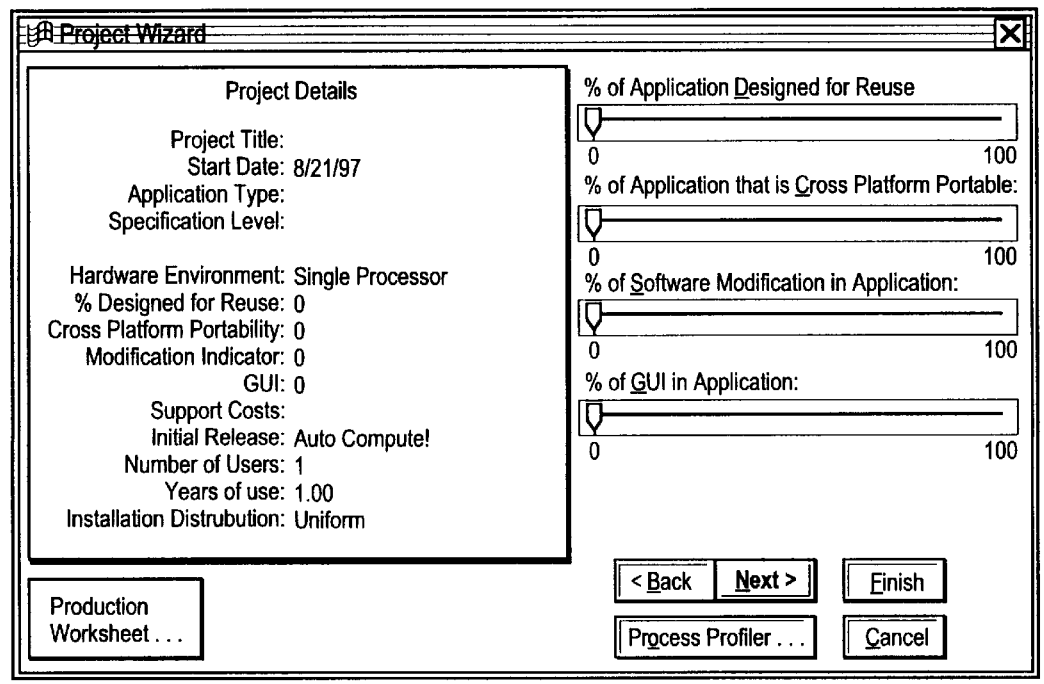
FIG. 5 is a screen illustrating additional parameters which can be specified.

FIG. 3 illustrates an exemplary input screen of a type presented to the user in the step 102 for the purpose of specifying various system or element characteristics. FIGS. 4, 4a and 5 illustrate additional screens presented to the user for the purpose of specifying additional system or element characteristics if known. If some or all of the more detailed characteristics of the proposed system are unknown, default values can be used which can subsequently be altered and the cost estimating step 108 rerun for the purpose of providing an updated estimate.

Figure 6:
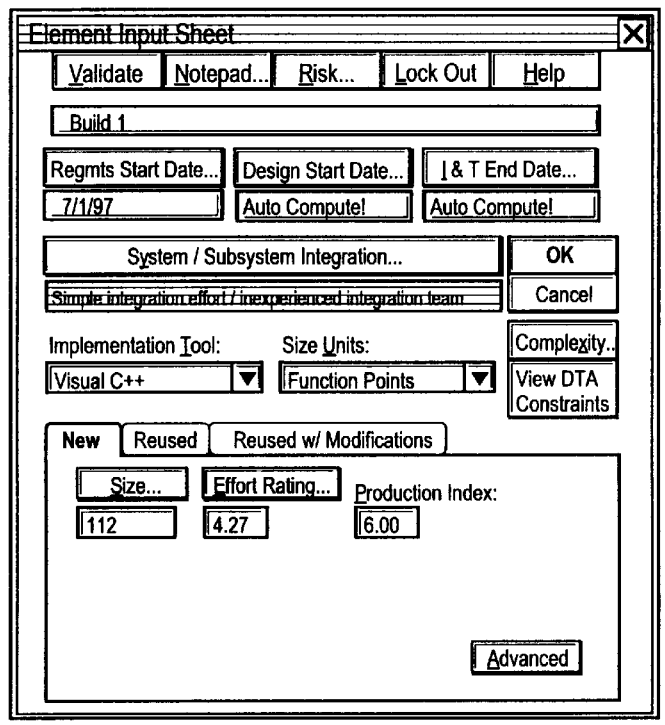
FIG. 6 is a screen usable for specifying characteristics of a specific, new software element.
Figure 7:
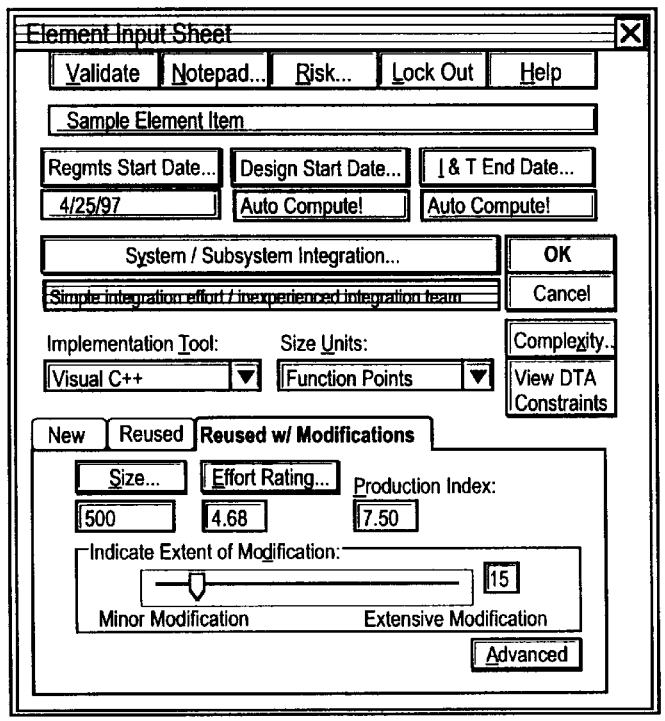
FIG. 7 is a screen usable for specifying characteristics of a specific existing software element which is to be modified.

The system 10 also provides for segmenting the proposed software to as detailed an extent as desired. Elements which are part of the proposed system can be specified using an element specifying input screen, illustrated in FIG. 6. In the screen of FIG. 6, a new element, "Build One" is specified by adding additional information to the previously entered system specifying information. In the example of FIG. 6, a function points metric has been selected. Size of the proposed element is estimated at 112 function points.

Where an existing element is to be used with modifications, that element can be specified using a screen illustrated in FIG. 7. The information in the screen of FIG. 7 has been inherited in part from previously supplied higher level information. The size of the package to be modified is estimated and inserted as 328 function points. The extent of the required modification is indicated, 33%. Where appropriate, the modification value can be locked so that the subsequent processing does not alter that parameter.

Where organization information is available to help to define the ongoing design and implementation process, that information can be entered by means of a process profiler screen as illustrated in FIG. 8. For example, the screen of FIG. 8 indicates that various CASE tools are available for use with the project and have been specified in the upper right hand portion of the screen of FIG. 8.

FIG. 9 illustrates the results of carrying out the forecasting process of the step 108. It provides a basic estimate as a result of entered parameters and default values.

Figures 10, 11:
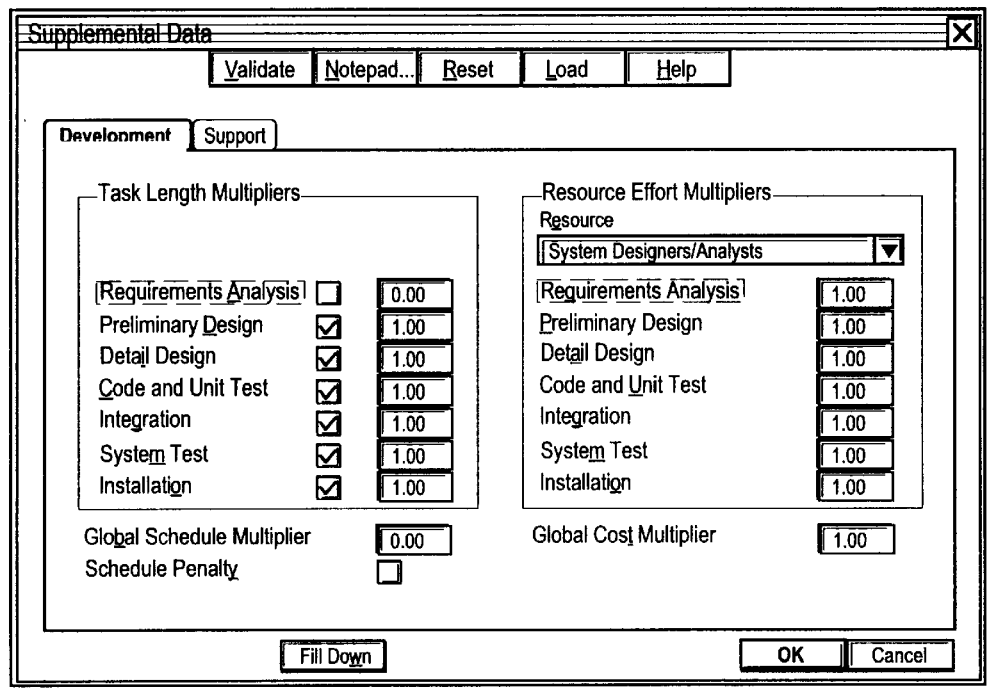
FIG. 10 is a screen illustrating modification of the results of the forecast of FIG. 9.
FIG. 11 illustrates the forecast of FIG. 9 modified in accordance of the screen of FIG. 10.

If desired, various of the tasks identified in the default estimate of FIG. 9 can be altered graphically as illustrated by the screen of FIG. 10. In the screen of FIG. 10, the requirements analysis line illustrated in FIG. 9 has been eliminated by removing the check mark in the box to the right of the requirements analysis line. Other functions can be removed or their associated multipliers adjusted graphically as illustrated in FIG. 10. The effect of the removal of the requirements analysis task from the estimate of FIG. 9 is illustrated in FIG. 11.

The process 100 thus enables a user to incorporate a selected metric or metrics into the process of creating software estimates or forecasts. The user is thus able to, in an informed fashion, forecast requirements to completion. These are usually measured in labor units such as months, days or hours expended to perform project tasks and functions; costs, namely effort converted to currency by use of labor rates overheads profit margins and wage escalation factors; duration of the project schedule from beginning to end as well as quality which is indicative of resulting project features and the ease and accuracy with which they can be carried out.

Utilizing the system 100 thus enables a user to project labor units/costs for various phases of the software project. These projected phases include the following which are illustrated in FIG. 12 in an exemplary screen.

As those of skill in the art will appreciate, the value of the system 10 and process 100 is clearly presented by the forecast of FIG. 12. This forecast is based on preliminary system information and specifications that are available long before any detailed system design, coding or labor hour estimates are available. The forecast of FIG. 12 thus estimates the effort needed, expected process phases and time intervals to a successful conclusion. With the application of appropriate labor rates, cost estimates can be provided.

Requirements Definition: This is the process of specifying what the software is supposed to do. The documentation that results will be the specification for the development or modification. Establishing lasting software requirements is difficult. As a result, requirements definition is revised often over a systems life. Many points of view will influence the specifications resulting from requirements definition—customers, marketing department, software developers, and executive management are among them.

From a statement of needs, the development department will evaluate the likely forecast of effort and time on a technical basis. Based on this forecast, a decision will be made to either pursue the project to the next phase or stop.

Design: The first step in the design phase is to describe the software to be developed from an architectural point-of-view. This will include a description of the overall data flow through the system. This portion of design results in Preliminary Design Documents that will also cite any off-the-shelf software that can meet requirements with little or no modification.

Many fundamental design decisions are made during this phase. The platform selected for operation will be confirmed or changed; the implementation tool and syntax conventions will be verified; and the development library will be specified. In some cases, a feasibility study will be part of the early a design phase. The study may address areas of technical risk and attempt to demonstrate the development organization ability to meet them.

Another design option, related to the feasibility study, is creation of a product prototype. Prototypes are developed with a minimum of design documentation and will encompass only those functions deemed to be risky to implement. In addition to mitigating risk concerns, a prototype can be useful for detailed design by serving as a demonstration vehicle to potential system users.

Detailed design will include all specific task assignments in the product development. The detailed design document will focus on a module by module definition of exactly what is to be modified from existing modules, what is to be created new, and how the data flows into, out of, and within each module. Resources to perform specific task may be assigned to designers, programmers, and testers. Test and quality plans will often be developed as part of the detailed design phase.

Software product testing can involve five or more levels of distinct tests. Each is intended to verify different aspects of the systems ability to meet requirements.

The most fundamental test is the unit test, where each function within the software is range verified against the design specification. The next level of testing is integration testing to verify that data flows properly among modules and subsystems. Both of these tests are usually performed by the product development team.

The third test level is referred to as the alpha test, which simulates the user environment. This test is often performed by developing organization team members who were not part of the tested product creation.

The fourth level of test plans identify potential test sites for beta testing, which involves release of a working system to potential users. The fifth and final level of testing is the acceptance test, in which personnel internal to the development organization review all previous test results and documentation for assure compliance with standards.

Programming and System Development: During this phase, the project development staff creates source code or objects (in object oriented systems) for each function documented in the detailed design. Each created item is unit tested according to the detailed plans of the design phase and documentation is created for future maintenance. Each module is integrated according to design. Integration testing is performed and any required corrections made to ensure that requirements are met.

System Testing: Alpha and beta testing are performed during this phase of the project. The results of these tests may require reiteration of prior phases to more completely meet design objectives. In addition to the software, all documentation is reviewed during this phase as well.

Production Release and Distribution: After all testing has been successfully completed, quality assurance personnel will approve the software product and its documentation for production and distribution to users. This marks the product for market release and ends the creation phases of the product. From this point on, the software is considered in use.

Product Maintenance and Enhancement: All changes and corrections to the software during its period of use fall into the product maintenance and enhancement phase. Normally, enhancements expand the functionality of the software product by adding new capabilities or widening the spectrum of solutions for existing functions. Maintenance involves repair of defects that escaped detection during test.

The preferred metric where object oriented software is being estimated takes into account the unique characteristics of object oriented solutions. Object oriented solutions are based on the behavior of objects. These behaviors can be transferred, or inherited from one clas to another, derived, class. Inheritance and inter-object communication can vary widely between software implementations. Preferably these properties will be reflected in any selected metric.

Several authors have previously proposed various metrics for use with object oriented software. Some of these have been discussed in "Objective Measures", A. Minkiewicz, Software Development, V. 5 No. 6, page 43, June, 1997.

Predictive Object Points (POPs), the preferred size metric, combines several of the metrics presented in the current literature for the purpose of measuring object oriented software. They are all metrics which can be estimated early on in the development process. They should remain stable if estimated from a good analysis. Together they measure parameters which are now known to be important in an object oriented project. These include the classes developed, how those class behave and what the effects of that behavior are, as well as a measure of the breadth and depth of the intended class structure. The metrics included in POPs are:

Number of Top Level Classes (TLC)
Average Number of Weighted Methods per Class (WMC)
Average Depth of Inheritance Tree (DIT)
Average Number of Children per Class (NOC).

Each of the above metrics is described below along with an explanation as to why it is important to the POPs metric.

Number of Top Level Classes (TLC)—This metric is a count of the classes which are the roots in the class diagram—from which all other classes are derived.

Weighted Methods per Class (WMC) This metric is an average of the number of methods per class, where each method is weighted by a complexity based on type of method, number of parameters, and number of properties the method affects. This metric is the heart of the estimate. There appear to be two general schools of thought in the determination of object oriented metrics suitable for size estimation (size as it relates to effort and productivity)—use a count of the total number of distinct objects or use a count of Weighted Methods Per Class of objects. While the number of objects has shown promise as a useful effort estimator, we favor using a WMC count for several reasons:
they can be estimated early in the problem analysis phase
methods relate to behavior and in so doing provide a corollary to Function Points for tracking productivity
WMC counting methods can be developed which are similar to Function Pint counting methods
WMC counts are relatively independent of implementation detail.

Average Depth of Class in Hierarchy Tree (DIT)—Each class described can be characterized as either a base class or a derived class. Those classes which are derived classes, fall somewhere in the class hierarchy other than the root. The DIT for a class indicates how deep it is in the inheritance tree—the length (in number of levels) from the root of the tree to the particular class. For example, in FIG. 2, the DIT for class C is 3 because there are three levels between the root, A, and class C. This average of the DIT for each class is used to add complexity considerations to the Object Point Count.

Average Number of Children per Class (NOC)—Each class has zero or more direct descendants (derived class). The NOC is a count of these derived classes. For example, in FIG. 13, the NOC for class A is 3. This average of the NOC across the parent classes is used to add breadth to the object point count.

The process for counting POP's

Identify Top Level classes of item being estimated

During an object oriented analysis, the analyst will determine the use cases or scenarios upon which the design will be based—these are merely a description at some level of formality that describe the things that need to be done to solve the problem posed. From these use cases, the analyst can identify the nouns as potential objects and the verbs as behaviors or methods of those objects. These objects can then be grouped together into similar objects—these are the top level classes referred to.

Identify the methods in each top level class

The verbs from the above item are the methods for the top level classes.

For each method determine

Method type—the method can be classified as follows

Constructors—methods which instantiate an object.

Destructors—methods which destroy an object.

Modifiers—methods which change the state of an object. A modifier will contain references to one or more of the properties of its's own class or another class.

Selectors—methods which access the state of an object but make no changes. These are the methods used to provide the public access to the data that is encapsulated by the object.

Iterators—methods which accesses all parts of an object in a well defined ordered, such as the functionality necessary to advance through a queue.

Number of properties (in item) it changes

A method has the capability of changing the properties (the state) of the object it belongs to—it also may change properties in other objects. This value indicates how much influence the method has on the system and how it impacts complexities due to object—to object communication.

Number of messages (in item) it responds to.

A method provides services to the rest of the system by responding to messages passed to it. This indicates the responsibilities the method has to the rest of the system.

Determine method complexity for the methods

First use Table 1 to determine low, average or high based on number of messages responded to (MSG) and number of properties affected (PRP).

TABLE 1

| MSG\PRP | 0 -> 1 | 2 -> 6 | 7 OR MORE |
|---|---|---|---|
| 0 -> 1 | low | low | avg |
| 2 -> 3 | avg | avg | high |
| 4 or more | aog | high | high |

Then, using the values from Table 2, determine the complexity for the methods.

TABLE 2

| METHOD TYPE | METHOD COMPLEXITY | WEIGHT |
| --- | --- | --- |
| Destructors/Constructors | Low (wd1) | 1 |
| | Average (wd2) | 4 |
| | High (wd3) | 7 |
| Selectors | Low (ws1) | 1 |
| | Average (ws2) | 5 |
| | High (ws3) | 10 |
| Modifiers | Low (wm1) | 12 |
| | Average (wm2) | 16 |
| | High (wm3) | 20 |
| Iterators | Low (wi1) | 3 |
| | Average (wi2) | 9 |
| | High (wi3) | 15 |

The Weighted Methods per class metric can then be determined;

WMC = Number Low Constructors/destructors*wd1 +
Number Avg Constructors/destructors*wd2 +
Number of High Constructors/destructors*wd3 +
Number of Low Selectors*ws1 +
... +
Number of high iterators*wi3

The Average NOC and DIT can be determined from top level information.

Based on the to P level analysis performed earlier, count the number of children each parent class is expected to have then determine the average depth in inheritance tree for each class.

The value of the predictive object points metric can now be determined:

$$POPs = \frac{WMC}{7.8} * TLC * (1 + (DIT * (1 + NOC)))$$

Figure 14:
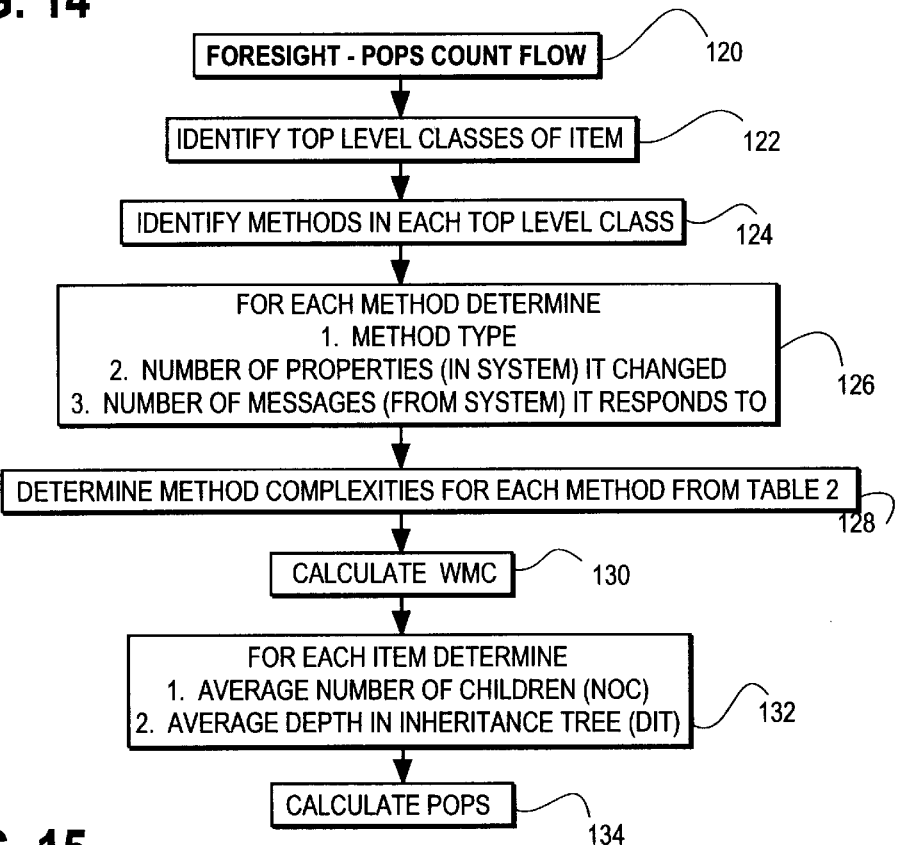
FIG. 14 is a flow diagram illustrative of a method of determining a metric especially adapted for use with object oriented software.

FIG. 14 illustrates steps of a method 120 for determining a count of predictive object points as discussed above. In a step 122 the top level classes of an item which could be a system or sub-system are identified. In a step 124, the methods in each top level class are identified.

In a step 126 for each method type, the number of properties and number of messages are determined. In a step 128, the values from Table 2 are used to determine the complexity for each method. In a step 130, the weighted methods per class (WMC) are determined. In a step 132, for each item, the average number of children and the average depth in the inheritance tree are determined.

In a step 134, a calculation is carried out to establish a value of predictive object points. The resultant value can in turn be incorporated, as a complexity indicator, into the forecast or cost estimating step of FIG. 1.

Figure 15:
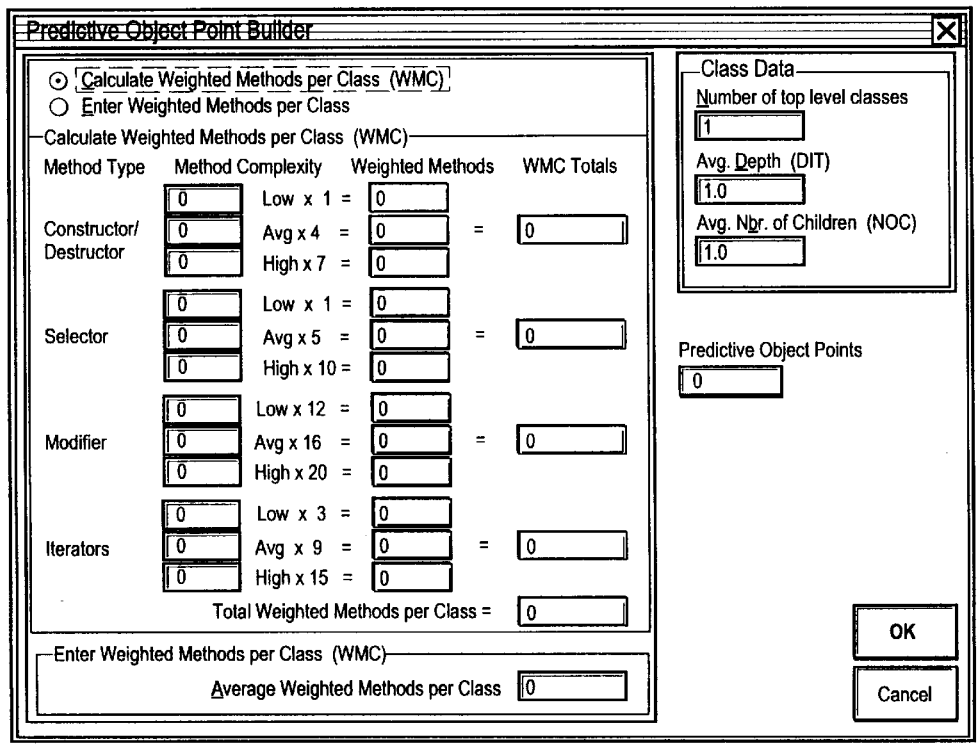
FIG. 15 is a screen for entry of parameters for determining a metric as illustrated in FIG. 14.

FIG. 15 is a screen which can be used to enter various characteristics of the proposed object oriented software which includes a number of top level classes, depth of inheritance tree, and number of children. Subsequent to entry of the required parameters, based on available information, the metric determination can be carried out.

Figure 16:
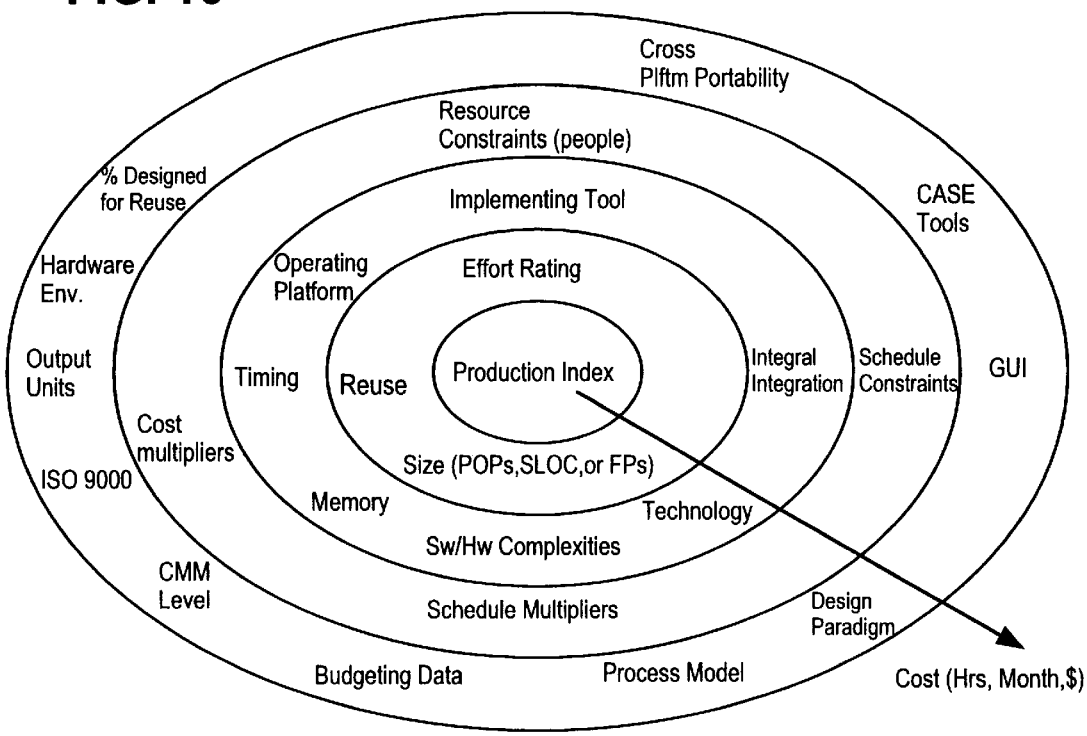
FIG. 16 is a diagram illustrating various parameters levels of the system of the type that can be forecast using the method of FIG. 2.

FIG. 16 is a multi-layer diagram 40 which illustrates the relationship of various parameters used to specify software systems for forecasting purposes to one another. The L1 layer indicates the most specific parameter class including production index which is indicative of production rate. The L2 layer includes effort rating, extent of use, and size parameters. The L3 layer includes internal integration, implementation tool, platform, software/hardware complexity and technology specifying timing and memory constraint parameters.

The L4 layer includes resource constraints, schedules constraints, multipliers for both scheduling and costs. The L5 layer includes the most general parameters including portability characteristics, CASE tools for requirements design and the like, budget information interface characteristics and other high level systems specifying parameters.

Figure 17:
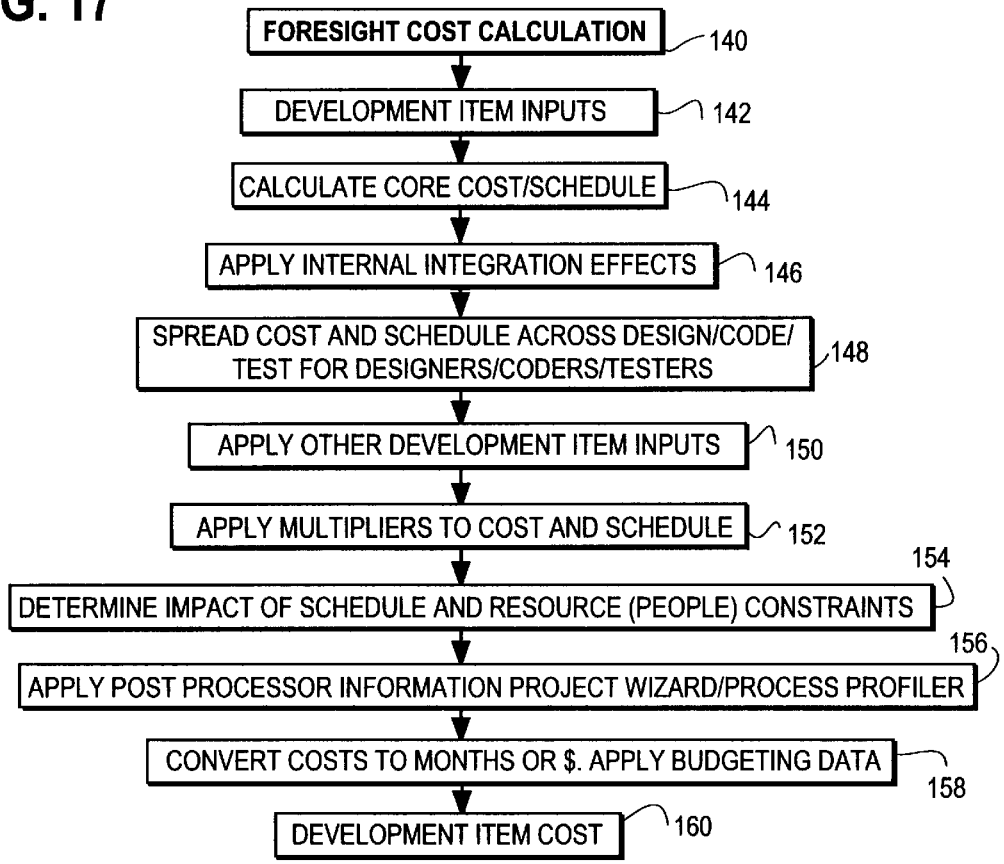
FIG. 17 is a more detailed flow diagram of the estimating step of FIG. 2.

The estimating step 108 is illustrated in more detail in the method steps 140 of FIG. 17 which is in turn related to the various parameters illustrated in FIG. 16. In a step 142, information pertaining to various elements or items to be developed are retrieved as previously input. These include layer L1 and L2 parameters such as production rate, effort rating, size characteristics of the elements or items such as whether new, modified, reused as well as metric value, which could be selected from a class including source line of code, metric, function point metrics or predictive object point metric.

In a step 144, a core cost and schedule can be determined in labor hours and duration such as days or months. In a step 146, layer L3 parameters associated with internal integration effects are taken into account to provide a modified core cost parameter. In a step 148, costs and schedule length are spread across the design, code and test tasks of the proposed development project. Outputs include cost and labor hours to design, code and test as well as schedules and days for the respective processes.

In a step 150, other layer L3 inputs such as implementation tool, software and hardware complexities timing and memory constraints are applied to the core costs forecasts from the step 146 to produce a forecast of labor hours for designing, coding and testing as well as respective schedules in days or months.

In a step 152, layer L4 multipliers for costs and schedule for design, coding and testing are applied to the labor hours and schedule forecasts adjusted by the cost multipliers as well as schedules adjusted by the tasks or schedule multipliers.

The impact of schedule and resource constraints is addressed in a step 154. The system will calculate a base line reference schedule using optimal resources for the item or element to be developed. Where schedule and resource constraints are present both costs and schedule will be adjusted, and there may well be a cost penalty as a result.

In the step 156, the level L5 layer parameters concerning the project and the organization thereof are taken into account and used to develop costs and schedule multipliers. Outputs from the step 156 are labor hour or currency based and schedules adjusted for the layer L5 parameters. In a step 158, costs in labor hours or intervals such as months are converted using labor rates and taking into account budgeting data to produce currency based costs forecasts in a step 160.

Figure 18:
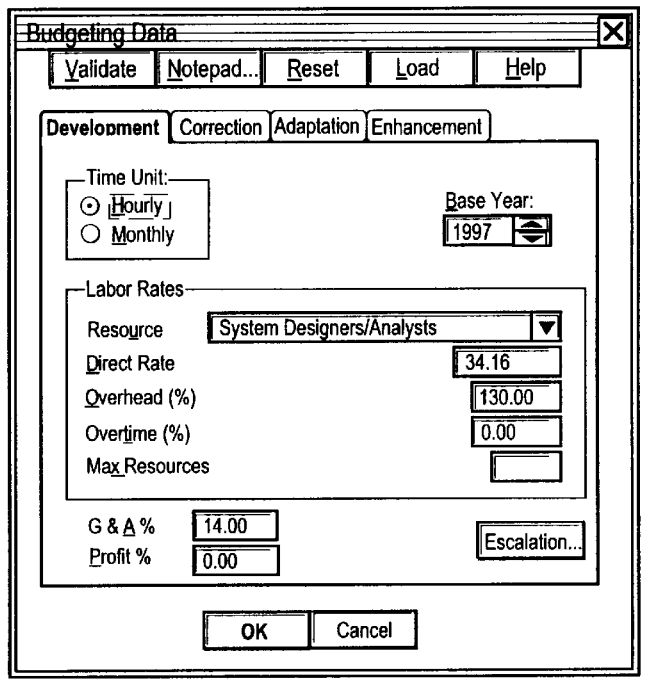
FIG. 18 is a screen usable for entering of budgetary—date.

Additional details pertaining to the forecasting process are disclosed and described in the Attachment hereto. FIG. 18 is a screen illustrating various types of budgeting data which can be entered by user for purposes of specifying cost based labor rates and related parameters.

Figure 19:
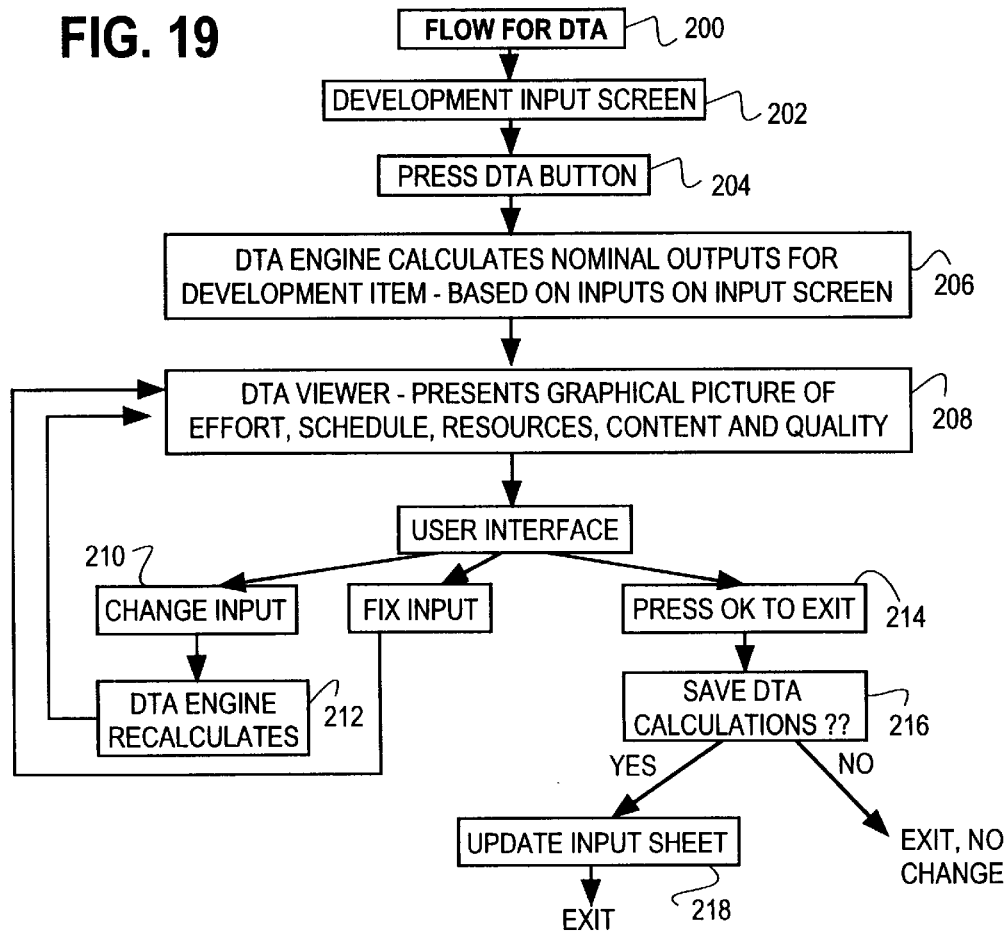
FIG. 19 is a flow diagram of the method of carrying out dynamic trade-off analysis of a forecast generated by the method of FIG. 2.

FIG. 19 is a flow diagram illustrating steps of a method 200 of dynamic trade-off analysis (DTA). The method 200 is invoked via the element input screen, FIG. 6. Clicking on the button labeled "view DTA constraints" in a step 204 invokes the method 200. In response to the step 204, a determination is made, based on entered parameters, default values and forecast values, of nominal outputs for a development item as indicated in step 206.

Figure 20:
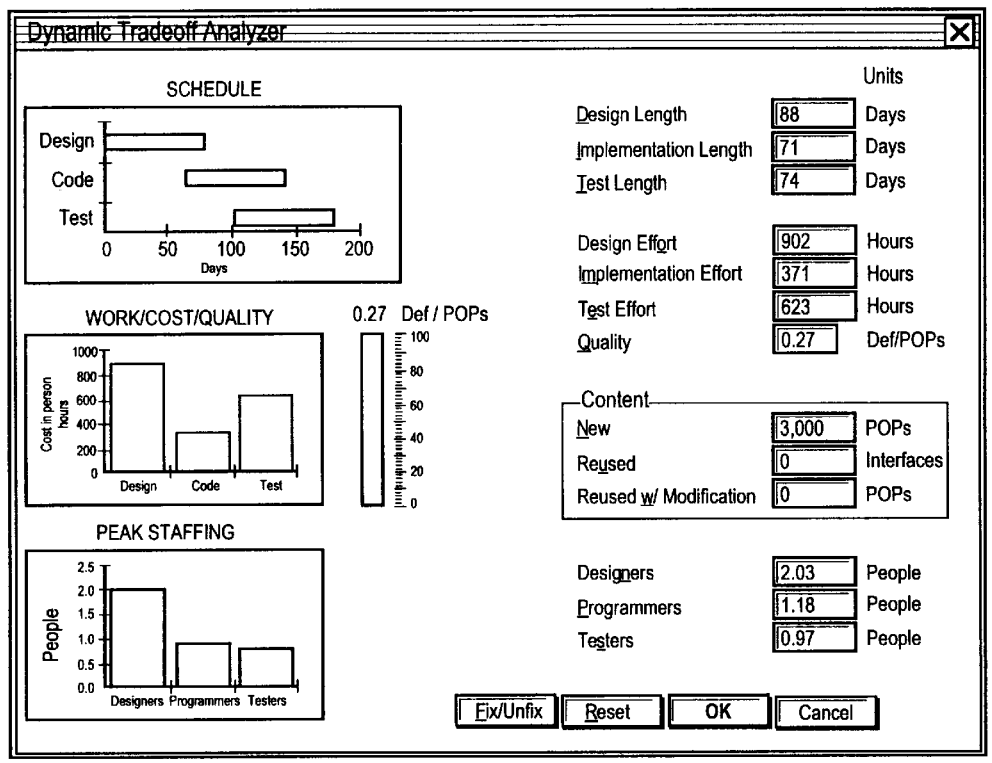
FIG. 20 is a screen illustrating nominal results from the forecasting method of FIG. 2.

FIG. 20 illustrates in a graphical format a nominal DTA screen which results from the step 206. The screen of FIG. 20 includes scheduling information, costs and quality information, staffing information of the type useful to technical and engineering managers in forecasting and managing projects. The nominal outputs on the screen 20, step 208, reflect information from the basic forecasting output screen, illustrated for example in FIG. 9.

In a step 210 constraints can be imposed on various of the characteristics illustrated in FIG. 20. Subsequently in a step 212, the DTA processor recalculates the nominal outputs from FIG. 20 and redisplays the updated outputs, step 208, as illustrated in FIG. 21.

Figure 21:
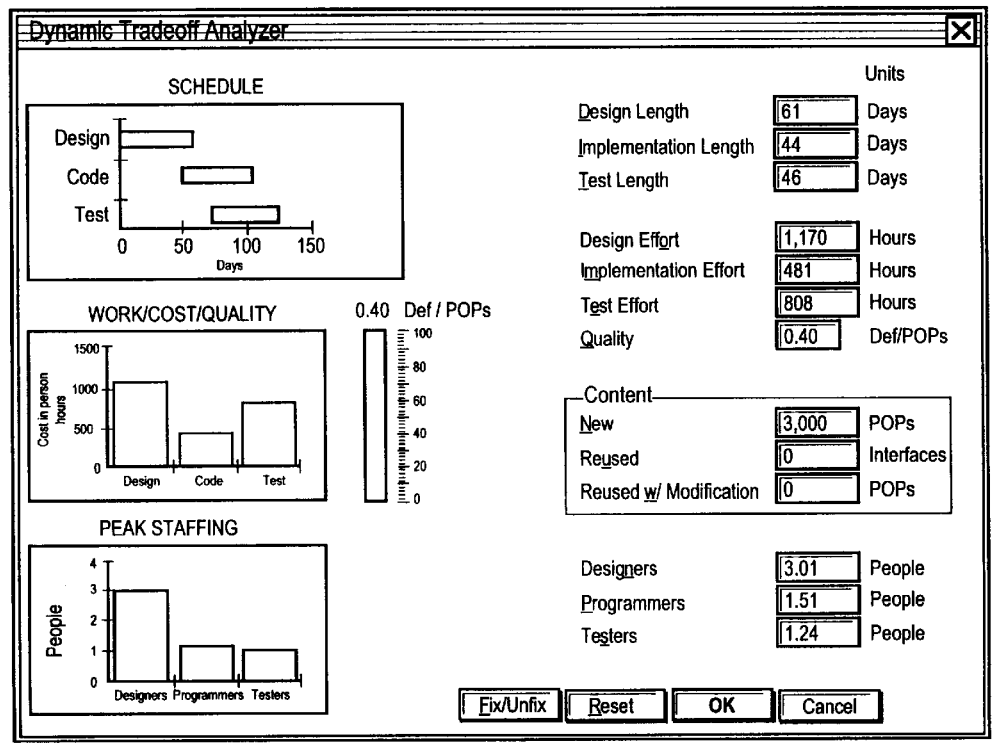
FIG. 21 is a screen illustrating the effects of a compressed schedule.

FIG. 21 reflects changes to the process in response to compressing the schedule over the schedule of FIG. 20. By imposing constraints or altering various project characteristics and re-executing the processing step 212, a user is able to graphically assess the consequences of various potential development scenarios. In addition to illustrating the consequences, the process also identifies for the user parameters particularly sensitive to one proposed change or another.

Figure 22:
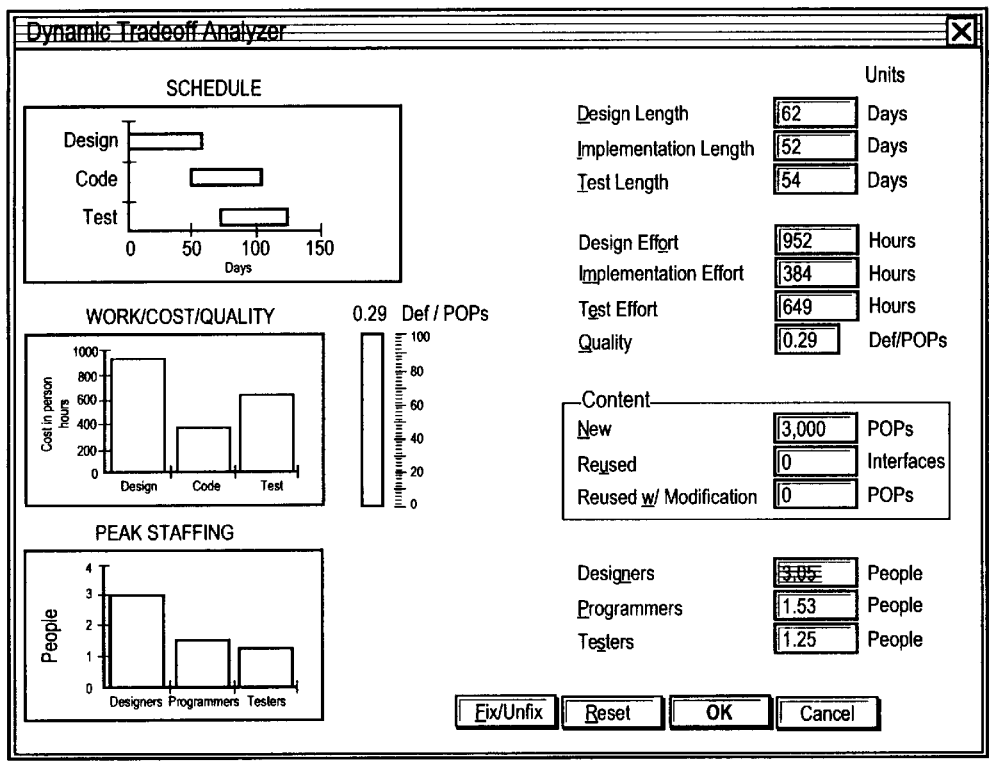
FIG. 22 is a screen illustrating the effects of fixed resources.

FIG. 22 illustrates the consequences on the results of the screen of FIG. 20 of imposing personnel constraints thereon. As illustrated in FIG. 22, design length, implementation length and test length have all decreased in response to increasing peak staffing levels beyond that illustrated in FIG. 20.

Figure 23:
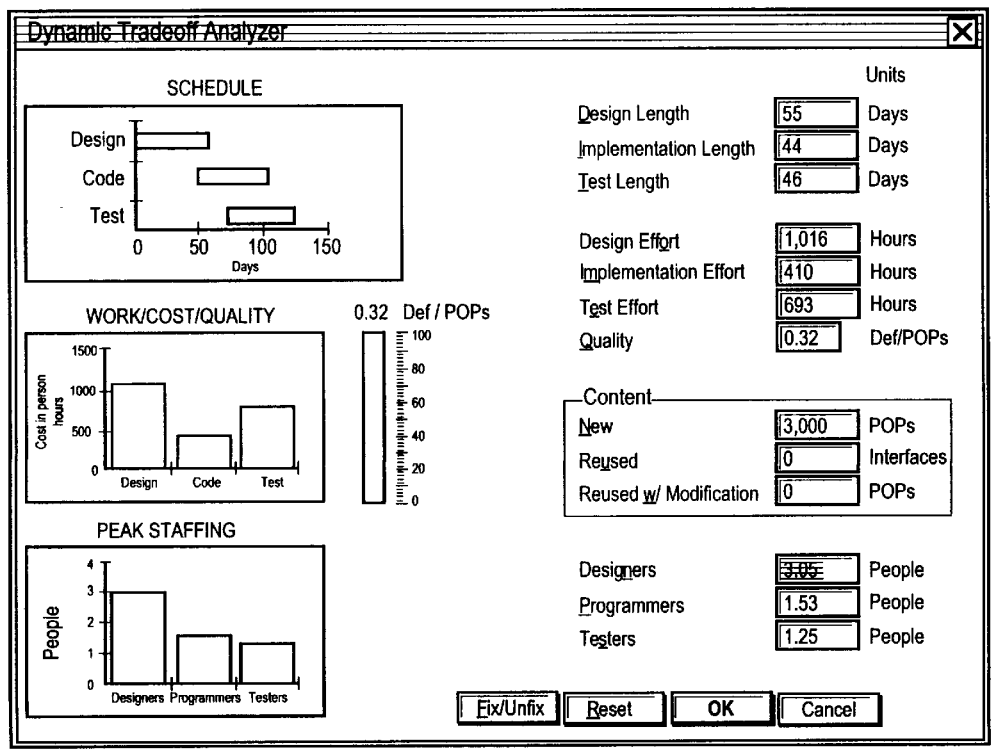
FIG. 23 is a screen illustrating the effects of fixing the resources and imposing additional constraints subsequently.

The screen of FIG. 23 illustrates the consequences on the forecast of FIG. 20 of imposing additional scheduling constraints once the resource constraints of FIG. 22 have been put into place.

When satisfied, the process can be exited in a step 214. The last set of results can be saved if desired in a step 216. In a step 218, the element parameter input screen, FIG. 6, can be updated.

From the foregoing, it will be observed that numerous variations and modifications may be effected without departing from the spirit and scope of the invention. It is to be understood that no limitation with respect to the specific apparatus illustrated herein is intended or should be inferred. It is, of course, intended to cover by the appended claims all such modifications as fall within the scope of the claims.

ATTACHMENT

1. Core Engine Process (Layers 1 & 2)
   Input Data
   1. Production Rate
   2. Effort Rating
   3. Size (new, modified, reused)
   4. Size units
   Output Data
   1. Core Cost in LH
   2. Core Schedule in Days
   Processes
   Calculate core cost/effort There are three core costs given here: one for Predictive Object Points (POPs), one for Source Lines of Code (SLOC) and one for function points. The form of each is similar but each derives from analysis of different data. The exponent is driven by both production rate and effort rating. There is normally a diseconomy of scale associated with software development. This diseconomy of scale (more cost per function point, SLOC or POPS as the number of function points, SLOC or POPs increases) is caused by the increased number of interfaces required for larger software projects.

The effort rating is used to drive this exponent up since we can assume that as the complexity of the code increases the complexity of the interfaces increases as well. However, an organization with good processes in place (hence higher production rate) can expect to see a more linear trend. The cost (effort) coefficient is a function of the production rate of the organization. The units for the core cost are hours $$CC = C_{NEW} + C_{MOD}$$

$$C_{NEW} = f(SIZE_{NEW}, SizeUnit, ProdRate, EffortRating)$$

$$C_{MOD} = f(SIZE)_{MOD}, SizeUnit, ProdRate, EffortRating)$$

$C_{NEW}$—Core Cost For Function Points $$CoreFPCost(P, E, S) := \left[9.3 - 2 \cdot \ln(P) + 10 \cdot \left(\frac{P}{100}\right)^2\right] \cdot \left(S \cdot \frac{E}{3.7}\right)^{(1.037 - .006 \cdot P + .004 \cdot E)}$$

$C_{NEW}$—Core Cost For SLOC $$CoreSLOCCost(P, E, S) := (.07 - .0015 \cdot \ln(P)) \cdot \left(S \cdot \frac{E}{3.7}\right)^{1.054 - .0085 \cdot P + .0001 \cdot E}$$

$C_{NEW}$—Core Cost For POPs $$CorePOPsCost(P, E, S) := ((3 - .65 \cdot \ln(P))) \cdot \left(S \cdot \frac{E}{3.7}\right)^{(1.0 - .0083 \cdot P + .01 \cdot E)}$$

To determine the cost of reusing code, use the percent of reuse to determine adjustment to the cost of developing the code from the ground up. Even if a very small amount of new code is being written there is a cost associated with becoming familiar enough with the code to make changes, as well as the costs associated with testing to ensure the integrity of all the code is maintained. The same modification to the core will apply regardless of the size units used for the Core $C_{MOD}$—Core Cost with reuse $$C_{NEW} = CoreCost1(P, E, S) * (0.11 + 0.03 * (100 - \%reuse)^{0.74})$$

Calculate Core schedule length

The schedule, like the cost, is driven by size, effort rating and production rate. The schedule is derived by raising the software volume to the 0.37 exponent, then applying a coefficient which is a function of the maturity of the organizations processes. The coefficient calculation varies depending on whether the size unit is POPs, SLOC or Function Points.

$$SL = S_{NEW} + S_{MOD}$$

$$S_{NEW} = f(SIZE_{NEW}, SizeUnit, ProdRate, EffortRating)$$

$$S_{MOD} = f(SIZE, SizeUnit, ProdRate, EffortRating, \%reuse)$$

Schedule effects are different for very small projects. In these cases very small teams (1 or 2 persons) are doing all the work—removing much of the time in the schedule that comes from interfaces and waiting for other developer's deliverables). The calculated schedule is adjusted to compensate for these factors in very small projects. As with effort, if there is reused code the core scheduled is adjusted by a function of the percent of reuse no matter what size units are specified.

$$SchedAdjust(S, SizeUnit) := \begin{Vmatrix} \text{if } SizeUnit = SLOC \\ \quad \begin{Vmatrix} S \leftarrow 100 \text{ if } S \leq 100 \\ adj \leftarrow \dfrac{65}{\ln\left(\dfrac{S}{10}\right)^2} \text{ if } S \leq 15000 \\ (adj \leftarrow 1) \text{ otherwise} \end{Vmatrix} \\ \text{If } SizeUnit = FP \\ \quad \begin{Vmatrix} \left(adj \leftarrow \dfrac{19}{\ln(S)^2}\right) \text{ if } S \leq 75 \\ (adj \leftarrow 1) \text{ otherwise} \end{Vmatrix} \\ \text{if } SizeUnit = POPs \\ \quad \begin{Vmatrix} \left(adj \leftarrow \dfrac{22}{\ln(S)^2}\right) \text{ if } S \leq 100 \\ (adj \leftarrow 1) \text{ otherwise} \end{Vmatrix} \\ adj \end{Vmatrix}$$

$S_{NEW}$—Core Schedule for Function Points $$CoreFPSched(P, E, S) := (1.38 - .11 \cdot \ln(P)) \cdot \left(S \cdot \dfrac{E}{4}\right)^{.37} \cdot \dfrac{30.4}{SchedAdjust(S, FP)}$$

$S_{NEW}$—Core Schedule for SLOC $$CoreSlocSched(P, E, S) := (.253 - .017 \cdot \ln(P)) \cdot \left(S \cdot \dfrac{E}{4}\right)^{.37} \cdot \dfrac{30.4}{SchedAdjust(S, SLOC)}$$

$S_{NEW}$—Core Schedule for POPs $$CorePOPsSched(P, E, S) := (1.1 - .19 \cdot \ln(P)) \cdot \left(S \cdot \dfrac{E}{4}\right)^{.37} \cdot \dfrac{30.4}{SchedAdjust(S, POPs)}$$

$S_{MOD}$—Core Schedule with reuse $$percForSReused(percRe) := \begin{vmatrix} 0 \text{ if } percRe = 0 \\ (.11 + .15 \cdot percRe^{.39}) \text{ otherwise} \end{vmatrix}$$

CSchedReMod(P,E,S,percRe):=CoreSched(P,E,S)*percForSReused(percRe)

2. Apply Internal Integration(Layer 3)
Input Data
1. Core Cost in LH (CC)
2. Internal Integration Difficulty
3. Size New
4. Size Units
5. Prod Rate
6. Effort Rating
Output Data
1. Core cost including internal Int (CC1)
Processes
Software is not developed in large pieces, rather many small pieces are built and tested, then the small pieces are integrated together to build the whole. Depending on the complexity of the interfaces, the cost of internal integration can be a substantial part of the total cost. The cost for internal integration uses the same core cost as for new software with the size adjusted based on the users description of integration complexities.

$CC1 = CC + II$ $II = f(Size_{NEW}, Sizeunit, ProdRate, EffortRating, IntDiff)$

Calculate internal integration costs
Task difficulty
   Simple = 0
   Normal = 1
   Difficult = 2
Staff experience
   Highly = 0
   exper = 1
   new = 0
StaffExp := 1
IntDiff := 1
x := StaffExp + IntDiff
IntValue := if(x = 0,.2,if(x = 1,.3if(x = 2,.5,if(x = 3,.7,if(x = 4,1,0)))))

$$IntEffect(IntValue) := \dfrac{4 \cdot IntValue + 2 \cdot IntValue^3}{15}$$

CoreCost(P,E,S) := CoreCost1(P,E,S) + CoreCost1(P,E,(IntEffect(IntValue) · S))

3. Spread cost and schedule length across design, code, test
Input Data
  1. Core Cost (CC1)
  2. Process Maturity
Output Data
  1. Cost in LH for design, code, and test (C1[3])
  2. Schedule in days for design, code and test (S1[3])
Processes
There is a normal spread for costs across the design, code and test tasks of a software development. Several things cause this spread to change. As the size and complexity increase, the percent of total effort spent in the design and test activities increases. This is to accommodate for the design and test of increasingly many increasingly complex interfaces. As the organization's development processes mature, the organization spends more time in up-front design for the payoff in code and test time. The spread of costs across the design, code and test phases for the present model were determined by examining data from completed projects combined with existing information about how these costs are traditionally spread.

$$DesMult(S,E,Maturity) := .42 + ((Maturity - 1) \cdot .05) + \left(.007 \cdot \ln\left(\dfrac{S \cdot E}{150}\right)\right)$$

$$TestMult(S,E,Maturity) := .32 - ((Maturity - 1) \cdot .05) + \left(.008 \cdot \ln\left(\dfrac{S \cdot E}{150}\right)\right)$$

$$CodeMult(S,E,Maturity) := 1 - \begin{vmatrix} .42 + ((M - 1) \cdot .025) \ldots + \\ .007 \cdot \ln\left(\dfrac{S \cdot E}{150}\right) \end{vmatrix} - \begin{vmatrix} .32 - ((M - 1) \cdot .025) \ldots + \\ .008 \cdot \ln\left(\dfrac{S \cdot E}{150}\right) \end{vmatrix}$$

-continued $CA00(S,E,P,M) := .59 \cdot CoreCost(P,E,S) \cdot DesMult(S,E,M)$
$CA01(S,E,P,M) := .31 \cdot CA00(S,E,P,M)*DesMult(S,E,M)$
$CA02(S,E,P,M) := .39 \cdot CA00(S,E,P,M)*DesMult(S,E,M)$
$CA11(S,E,P,M) := .70 \cdot CoreCost(P,E,S) \cdot CodeMult(S,E,M)$
$CA10(S,E,P,M) := .17 \cdot CA11(S,E,P,M)CodeMult(S,E,M)$
$CA12(S,E,P,M) := .25 \cdot CA11(S,E,P,M)*CodeMult(S,E,M)$
$CA22(S,E,P,M) := .5 \cdot CoreCost(P,E,S) \cdot TestMult(S,E,M)$
$CA20(S,E,P,M) := .6 \cdot CA22(S,E,P,M)*TestMult(S,E,M)$
$CA21(S,E,P,M) := .4 \cdot CA22(S,E,P,M)*TestMult(S,E,M)$ $$\text{CostArray}(S,E,P,M) := \begin{pmatrix} \text{Design} & \text{Implementation} & \text{Test} \\ CA00(S,E,P,M) & CA10(S,E,P,M) & CA20(S,E,P,M) \\ CA01(S,E,P,M) & CA11(S,E,P,M) & CA21(S,E,P,M) \\ CA02(S,E,P,M) & CA12(S,E,P,M) & CA22(S,E,P,M) \end{pmatrix}$$

Spread schedule across design, code and test boundaries $$DesSchedMult(Maturity) := .44 + (Maturity - 1) \cdot .03$$
$$TestSchedMult(Maturity) := .24 - (Maturity - 1) \cdot .03$$
$$CodeSchedMult(M) := 1 - DesSchedMult(M) - TestSchedMult(M)$$
$$SchedArray1(S, E, P, M) = \begin{pmatrix} Sched1(P, E, S) \cdot DesSchedMult(M) \\ Sched1(P, E, S) \cdot CodeSchedMult(M) \\ Sched1(P, E, S) \cdot TestSchedMult(M) \end{pmatrix}$$

4. Apply other development inputs(Layer 3)
Input Data
 1. Core Cost (CC1)
 2. Inputs for Operational Specification(P1), Implementation Tool(ImpToolCmplx), Software and Hardware Complexities(Complexity,HCEff), Timing and Memory Constraints(utilNew)
Output Data
 1. Cost in LH for design, code, and test (C1[3])
 2. Schedule in days for design, code and test (S1[3])
Processes
 1. Apply the following adjustment to each cost in the cost matrix described above.

$(ImpToolCmplx)_0 \cdot PreDesPerc \cdot (0.763 \cdot Complexity + 0.237) \cdot utilNew \cdot techEff \cdot HCEff \cdot (0.92 \cdot P1+0.11)$ 5. Apply Cost and schedule multipliers (Layer 4)
Inputs
 1. Cost in Labor Hours
 2. Schedule in Days
 3. Cost and schedule multipliers for d/c/t for designers, coders, and testers
Outputs
 1. Cost in Labor Hours adjusted by cost multipliers
 2. Schedule in Days adjusted by task multipliers Processes
 1. Multipliers are linear multipliers to calculated costs and schedules 6. Determine the impact of schedule and resource constraints (Layer 4)

The present model will calculate a reference schedule with 'optimal' resources for the development item. There is often not the luxury of working under optimal conditions. If the schedule must be constrained then there is a cost penalty. Similarly, if the user has more (or less) people to work with (Peak Resources) than the model assumes, cost and schedule will be adjusted but there may be a cost penalty for this schedule adjustments Inputs
 1. Cost in LH
 2. Schedule in Days
 3. User constrained schedule
 4. User constrained resources
Processes
 1. If schedule is constrained—compare the calculated schedule to user supplied schedule. If there is a compression or expansion—apply the following penalty to cost. Calculate optimal resources (K varies for each type and task). If resources are constrained, adjust schedule, compare to optimal and assess additional penalties if schedule change warrants.

$$DTCostAdj(dctr, S, E) := \begin{Vmatrix} \text{penalty}\left[dctr, .6, \left(.92 + \frac{E}{12.5}\right)\right] \text{ if } (S \cdot E > 400) \\ \text{penalty}\left[dctr, .6 - .6 \cdot \left(1 - \frac{S \cdot E}{400}\right), \left(.92 + \frac{E}{12.5}\right)\right] \text{ otherwise} \end{Vmatrix}$$

$$opt\ Res = K * \frac{CostInHours}{ScheduleInHours}$$

7. Apply post processor Information (Layer 5)

The System level project and process input part of the GUI (reference FIGS. 4,4A,5) allow the user to input information about the project and the organization performing the project. This information is used to develop cost and schedule post process multipliers which are applied in this outside layer.

Inputs

1. Cost and schedule

2. System level project and process inputs

Outputs

1. Cost and schedule adjusted with post processor values

Processes

1. The following table illustrates how the project/process level inputs impact cost. There are applied multiplicatively to the costs

| Attribute | Tasks effected | Cost | Schedule |
|---|---|---|---|
| Hardware Platform - single processor | no affect | 1 | 1 |
| Hardware Platform - distributed processor | design | 1.2 | 1.2 |
| | code | 1 | 1 |
| | test | 1.2 | 1.2 |
| Hardware Platform - client/server | design | 1.5 | 1.3 |
| | code | 1.18 | 1.3 |
| | test | 1.1 | 1.3 |
| | correction | 0.75 | |
| | adaptation | 0.8 | |
| | enhancement | 0.85 | |
| Cross platform Portability (%) | design | (1 + (%/100*.3)) | (1 + (%/100*.3)) |
| | code | (1 + (%/100*.3)) | (1 + (%/100*.3)) |
| | test | (1 + (%/100*.3)) | (1 + (%/100*.3)) |
| | correction | (1 + (%/100*.3)) | |
| | adaptation | (1 + (%/100*.3)) | |
| | enhancement | (1 + (%/100*.3)) | |
| Design for Reuse(%) | design | (1 + (%/100*.45)) | (1 + (%/100*.5)) |
| | code | (1 + (%/100*.45)) | (1 + (%/100*.4)) |
| | test | (1 + (%/100*.45)) | (1 + (%/100*.5)) |
| GUI(%) | design | (.8 + (%/100*.6)) | (.8 + (%/100*.6)) |
| | code | (.8 + (%/100*.6)) | (.8 + (%/100*.6)) |
| | test | (.8 + (%/100*.6)) | (.8 + (%/100*.6)) |
| | correction | (.8 + (%/100*.6)) | |
| | adaptation | (.8 + (%/100*.6)) | |
| | enhancement | (.8 + (%/100*.6)) | |
| Case Tools | req | 1 + .1(if Req) | 1 + .1(if Req) |
| | design | 1 + .15(if des) - .05(if Req) | 1 + .15(if des) - .05(if Req) |
| | code | 1 - .2(if code) - .05(if design) | 1 - .15(if code) - .05(if design) |
| | test | 1 - .15(if test) - .02(if req) - .04(if des) | 1 - .15(if test) - .04(if req) - .04(if des) |
| | correction | .1(if sup) - .05(if req) - .05(if des) - .05(if cod | -.1(if sup) - .05(if req) - .05(if des) - .05(if cod |
| | adaptation | 1 - .1(if sup) - .05(if des) - .05(if code) | 1 - .1(if sup) - .05(if des) - .05(if code) |
| | enhancement | 1 - .1(if sup) - .05(if des) - .05(if code) | 1 - .1(if sup) - .05(if des) - .05(if code) |
| Process - Waterfall (no Adjustment) | | | |
| Process Spiral no exp -> max experience | design | 1.125 -> .94*(.98 + .02*nbrSpirals/3) | 1.125 -> .94*(.98 + .02*nbrSpirals/4) |
| | code | 1.17 -> .96*(.98 + .02*nbrSpirals/3) | 1.17 -> .96*(.98 + .02*nbrSpirals/4) |
| | test | 1.05 -> .96*(.98 + .02*nbrSpirals/3) | 1.05 -> .96*(.98 + .02*nbrSpirals/4) |
| | correction | 0.85 | |
| | adaptation | 1.02 | |
| | enhancement | 1.02 | |
| Process - Evolutionary development | design | 1.35 -> 1.25 | |
| | code | 1.33 -> 1.23 | |
| | test | 1.23 -> 1.13 | |
| | correction | 1 | |
| | adaptation | 1.1 | |
| | enhancement | 0.9 | |
| | all | | 1.25 -> 1.12 |
| Process - Incremental development | design | 1.25 - 1.13*(.96 + .04*nbrincr/2) | |
| | code | 1.2 -> 1.1*(.96 + .04*nbrincr/2) | |
| | test | 1.45 -> 1.32*(.96 + .04*nbrincr/2) | |
| | correction | 0.95 | |
| | adaptation | 1.1 | |
| | enhancement | 0.9 | |
| | all | | 1.3 -> 1.17 |
| Paradigm - structured (no adjustment | | 1 | 1 |
| Paradigm - OO | design | 1.15 | 1.15 |
| | code | 1 | 1 |
| | test | 0.8 | 0.8 |

8. Convert costs to cost output units

Inputs

1. Cost in labor hours
2. Output cost units
3. Budgeting data

Outputs

1. Cost in cost units

Processes

1. If costs units are months, apply the labor hour per month input value and convert to months
2. If cost units are hours—apply the labor rates for each labor category—apply escalation if requested from the escalation rate table,

What is claimed:

1. A method of forecasting characteristics of a software development project comprising:

selecting a size metric from an available class of size metrics;

entering software characterizing information for the proposed project in response to the selected metric forming a predictive metric indicative of software complexity;

entering parametric-type project characterizing information exclusive of project labor hour estimates;

producing a forecasting report including at least a labor estimate in response to the previously formed metric and the entered parametric-type information and communicating the forecasting report to the user.

2. A method as in claim 1 which includes entering risk analysis information before the producing step.

3. A method as in claim 2 which includes:

altering selected project characteristics; and determining revised project characteristics in response to the altering step.

4. A method as in claim 3 which includes graphically displaying an initial set of project characteristics; and graphically displaying a revised set of project characteristics in response to the altering step.

5. A method as in claim 3 wherein the selected predictive metric is adapted for use with object oriented software and wherein the forming step includes producing an object point metric for an object oriented software project.

6. A method as in claim 5 wherein the step of entering characterizing information includes entering a number indicative of predicted top level classes in the project.

7. A method as in claim 5 wherein the forming step includes determining as an object oriented size metric a representation of predictive object points.

8. A method as in claim 1 which includes estimating labor hours for a plurality of project phases.

9. A method as in claim 8 which includes estimating time durations for project phases.

10. The method as in claim 1 wherein said communicating the forecasting report to the user includes displaying the forecast report on a display screen.

11. The method as in claim I wherein said communicating the forecasting report to the user includes printing the forecast report on a printer.

12. A set of instructions for generating estimates for a proposed object oriented software system comprising:

instructions for enabling a user to enter estimated object oriented characteristics of a proposed system;

instructions, responsive to the entered characteristics, for generating an object related metric indicative of at least the estimated complexity of the proposed system; and instructions, responsive to the metric, for generating a system labor hour estimate, and wherein said instructions for enabling said instructions for generating an object related metric, and said instructions for generating a system labor hour estimate are executed by a programmable processor.

13. A set as in claim 12 which includes instructions for enabling a user to enter estimated parameters exclusive of an estimate of total labor hours.

14. A set as in claim 12 which includes instructions enabling a user to enter risk related information.

15. A set as in claim 14 wherein the estimate generating instructions include further instructions for incorporating entered risk related information.

16. A set as in claim 12 which includes instructions for altering at least one selected system parameter and for producing a revised output responsive thereto.

17. A set as in claim 16 which includes instructions for presenting the revised output graphically.

18. A set as in claim 13 wherein at least some of the cost parameters include labor rates.

19. A set of instructions, usable by a programmable processor, for generating estimates for a proposed object oriented software system comprising:

instructions for enabling a user to enter estimated object oriented characteristics of a proposed system;

instructions, responsive to the entered characteristics, for generating an object related metric indicative of at least the estimated complexity of the proposed system; and instructions, responsive to the metric, for generating a system labor hour estimate; and wherein said instructions for enabling, said instructions for generating an object related metric, and said instructions for generating a system labor hour estimate are stored on a computer readable medium.

* * * * *